(12) United States Patent
Guffond et al.

(10) Patent No.: US 9,110,197 B2
(45) Date of Patent: Aug. 18, 2015

(54) METHOD AND DEVICE FOR THE ANTICIPATED DETECTION OF ICING ON A RUNWAY

(75) Inventors: Didier Guffond, Fontenay-aux-Roses (FR); Robert Schegerin, Versailles (FR); Hervé Lachaud, Le Plessis Robinson (FR)

(73) Assignees: AER, Chevilly-Larue (FR); OFFICE NATIONAL D'ETUDES ET DE RECHERCHES AEROSPATIALES (ONERA), Chatillon (FR)

( * ) Notice: Subject to any disclaimer, the term of this patent is extended or adjusted under 35 U.S.C. 154(b) by 152 days.

(21) Appl. No.: 13/879,380

(22) PCT Filed: Oct. 13, 2011

(86) PCT No.: PCT/FR2011/000550
§ 371 (c)(1),
(2), (4) Date: Apr. 26, 2013

(87) PCT Pub. No.: WO2012/049380
PCT Pub. Date: Apr. 19, 2012

(65) Prior Publication Data
US 2013/0205891 A1 Aug. 15, 2013

(30) Foreign Application Priority Data
Oct. 14, 2010 (FR) .................................... 10 04040

(51) Int. Cl.
*G01W 1/00* (2006.01)
*G01R 27/04* (2006.01)
(Continued)

(52) U.S. Cl.
CPC .. *G01W 1/02* (2013.01); *G01W 1/14* (2013.01)

(58) Field of Classification Search
None
See application file for complete search history.

(56) References Cited

U.S. PATENT DOCUMENTS 3,836,846 A * 9/1974 Overall et al. ................ 324/643
3,873,927 A * 3/1975 Overall ........................ 307/650
(Continued)

FOREIGN PATENT DOCUMENTS

FR 2 605 402 A1 4/1988
FR 2 914 906 B1 10/2008
(Continued)

OTHER PUBLICATIONS

International Search Report for PCT/FR2011/000550, mailed on Apr. 19, 2012, 6 pages.

*Primary Examiner* — Peter Macchiarolo
*Assistant Examiner* — Jermaine Jenkins
(74) *Attorney, Agent, or Firm* — Christie, Parker & Hale, LLP

(57) ABSTRACT

Device and method for anticipating the deposition of ice on a runway, comprising an object having a non-zero relative velocity with respect to the atmosphere surrounding the runway, this surrounding atmosphere being at a certain temperature, a means for determining the thickness of ice present on said moving object, which further includes a temperature sensor for measuring the temperature of the runway, a means for regulating the temperature of said object in such a way that the temperature of said moving object is substantially equal to or slightly below the temperature of the runway, a computing means, for defining at time t0 a level of icing at time t1 of the runway as a function of the thickness of ice present on the object, and a warning means allowing the results obtained by the computing means to be communicated to a monitoring station.

10 Claims, 2 Drawing Sheets

(51) Int. Cl.
*G01W 1/02* (2006.01)
*G01W 1/14* (2006.01)

(56) References Cited

U.S. PATENT DOCUMENTS

| | | | |
|---|---|---|---|
| 3,882,381 A * | 5/1975 | Gregory | 324/667 |
| 4,335,613 A * | 6/1982 | Luukkala | 73/599 |
| 4,833,660 A | 5/1989 | Deom et al. | |
| 4,897,597 A * | 1/1990 | Whitener | 324/693 |
| 5,686,841 A * | 11/1997 | Stolarczyk et al. | 324/635 |
| 6,239,601 B1 * | 5/2001 | Weinstein | 324/662 |
| 6,596,189 B1 * | 7/2003 | Moles et al. | 252/70 |
| 6,758,091 B1 | 7/2004 | Nielsen | |
| 7,129,857 B1 * | 10/2006 | Spirkovska | 340/971 |
| 7,400,267 B1 * | 7/2008 | Doherty et al. | 340/905 |
| 8,485,473 B2 | 7/2013 | Picco et al. | |
| 2006/0061485 A1 * | 3/2006 | Doherty et al. | 340/905 |
| 2013/0226452 A1 * | 8/2013 | Watts | 701/528 |
| 2014/0012437 A1 * | 1/2014 | Jones | 701/15 |

FOREIGN PATENT DOCUMENTS

| | | |
|---|---|---|
| JP | 6174344 | 6/1994 |
| KR | 2009 0096065 A | 9/2009 |

\* cited by examiner

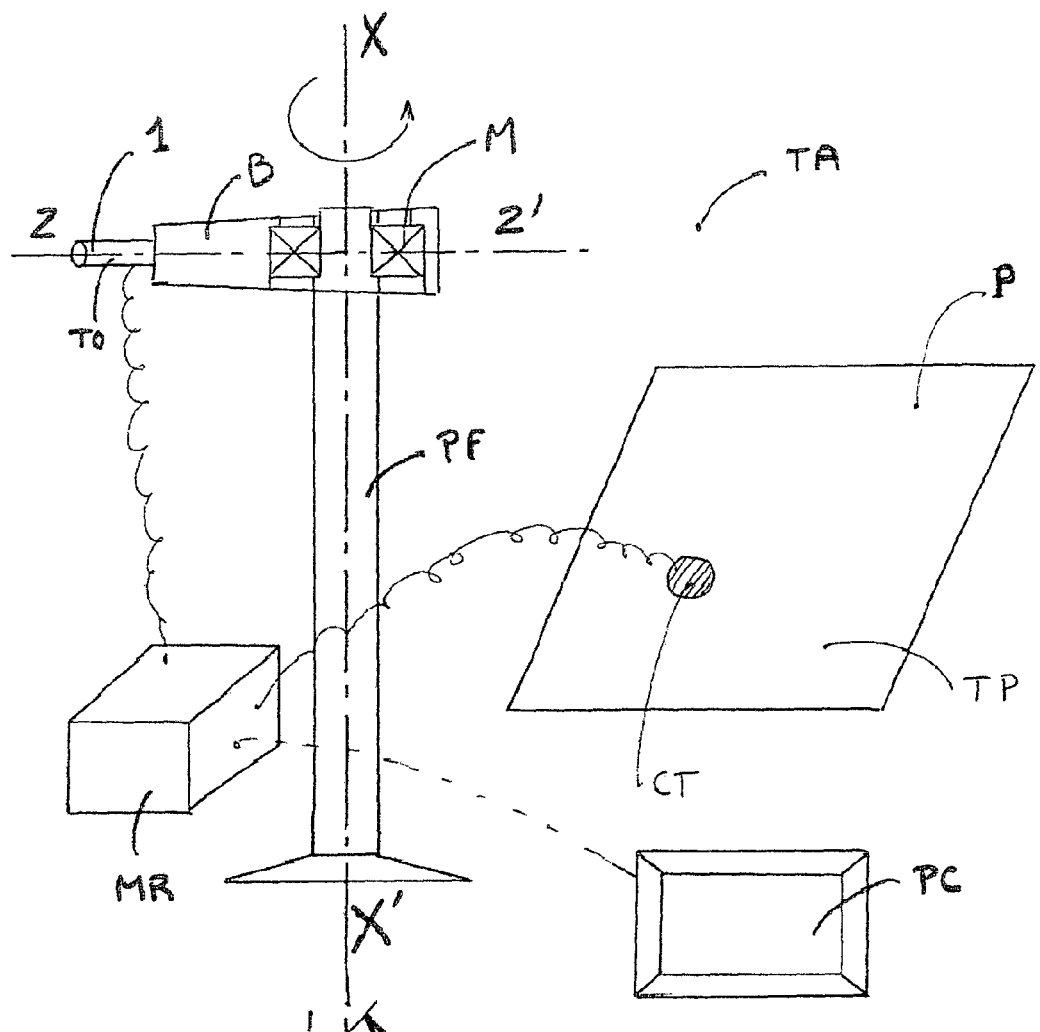
Fig 1
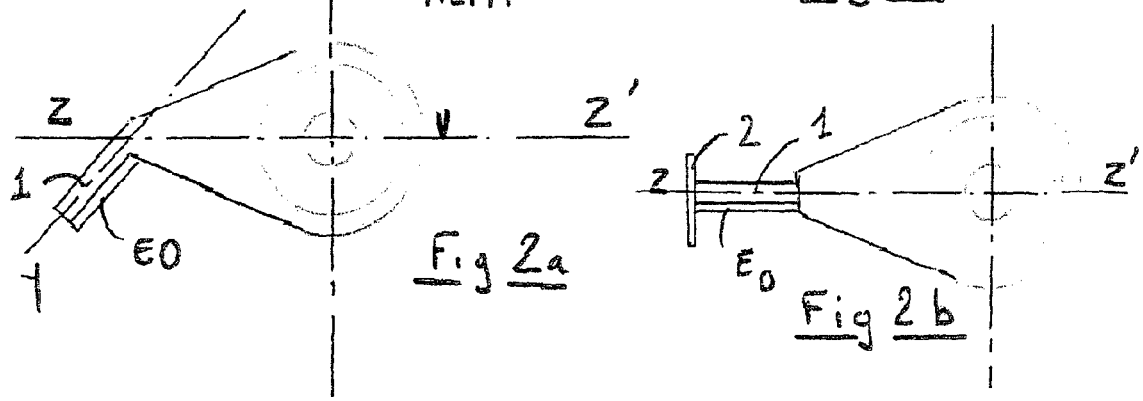
Fig 2a
Fig 2b

METHOD AND DEVICE FOR THE ANTICIPATED DETECTION OF ICING ON A RUNWAY

CROSS-REFERENCE TO RELATED APPLICATION

This application is a National Phase Patent Application and claims the priority of International Application Number PCT/FR2011/000550 filed on Oct. 13, 2011, which claims priority of French Patent Application Number 10/04040 filed on Oct. 14, 2010.

The present invention relates to a method and a device for the anticipated detection of icing on a runway.

It also relates to a device and a method for anticipating and accurately determining the deposition of frost on a moving surface.

It relates more particularly to the anticipation of the thickness of frost on a cycle path or road.

It relates more particularly to the anticipation of the thickness of frost on a runway for the take-off and landing of aircraft.

It relates more particularly but not exclusively to the anticipation of the presence of frost on a highway or motorway.

It also relates to the anticipation of the presence of frost on wind turbine blades or on frost-sensitive mechanisms.

At present, the length of the runways used for take-off and landing by military and commercial aviation is necessarily limited. The presence of a layer of frost substantially reduces the maximum mass admissible during take-off and/or landing. In practice, the braking distances required are considerably increased if frost is present on the runway. The control tower has to be aware of frost on the runway so that it can pass that information on to pilots. It is difficult to detect the presence of frost at night. The control tower therefore has to send teams to the runways in order regularly to check that no significant frost is present, which entails major expenditure.

The problem is similar for motorways. It is vital rapidly to know and if possible to anticipate the extent of frost on the road surface so that drivers can be informed and the de-icing (or defrosting) of roads organised.

Experience shows that it takes at least 30 minutes to organise communications and carry out de-icing (or defrosting). It is therefore imperative to be able to anticipate the appearance of a significant thickness of frost on the runway or road.

Ideally, it is necessary to be able to anticipate the deposition of frost as soon as it starts to appear. However, frost measurement systems function only when the thickness of the frost is greater than the thickness that entails a reduction of adherence to the runway. That is already too late.

There have been too many accidents because of an inadequate knowledge of the extent of frosting of roads or runways.

The object of the present invention is to resolve the stated problem of anticipating the presence of frost on a runway.

The invention also makes it possible to propose a solution through which the accuracy of the means of measuring the thickness of frost on a runway or a road may be improved.

There are many means for detecting frost. These include, by way of example, probes using ultrasound waves, magnetostrictive probes, probes using pressure variations, probes using optical or electro-optical beams, etc. There are also vibrating probes which, if they are covered with frost, have a specific frequency that varies with the thickness of the frost.

All these solutions have advantages and drawbacks, but do not make it possible to anticipate the formation of frost. They make it possible to detect the presence of frost only when the layer of frost is thick enough to be detected and possibly measured.

It may appear straightforward to analyse the various atmospheric parameters in order to deduce the probability of the appearance of frost therefrom. In practice, this phenomenon is much too complex, and it has proved to be very difficult or even impossible to predict the deposition of frost on a runway by analysing atmospheric parameters.

It is therefore necessary to design a device which does not just accelerate the deposition of frost but which is also representative of the temperature conditions of the runway. Following research, we have observed that there are major differences between the temperature of the surrounding air and the temperature of the runway. This is largely due to the fact that the first derivative of the temperature curve of the runway as a function of time is very different from the first derivative of the temperature curve of the air as a function of time with the result that the temperature of the runway may be very different from the temperature of the surrounding air at a given moment. Other parameters such as the illumination of the runway or the thermal inertia of the ground below the runway, for instance, further accentuate this phenomenon.

A number of devices have been proposed to measure the thickness of frost on a surface and have formed the subject-matter of the following patent filings:

Korean Patent Specification KR20090096065 discloses a device making it possible accurately to detect the dew point by analysing the vibration of a quartz crystal. This device does not make it possible to anticipate the deposition of frost on a runway;

French Patent Specification FR2914906 of 11 Apr. 2007 discloses a device making it possible to detect the presence of frost on an aircraft in flight. It does not make it possible to anticipate the presence of frost on a runway;

French Patent Specification FR2605402 of 15 Oct. 1986 discloses a device comprising a rotary object provided with a system for measuring the thickness of frost by ultrasound. This system does not take account of the runway temperature which may be very different from the temperature of the surrounding air. Consequently, the device disclosed by this patent is completely ineffective and cannot therefore be used when the runway temperature is different from the temperature of the surrounding air, which is often the case;

Japanese Patent Specification JP6174344 discloses a device comprising two temperature measurements at two points of an exchanger. This device in no way suggests the presence of an object moving in the surrounding atmosphere.

The invention manages to resolve the above problems by proposing a particularly well-suited device and method making it possible accurately to measure the thickness of frost EP and to anticipate the formation of frost on a surface such as a runway P or a road.

For that purpose, it proposes a device comprising:

an object having a non-zero relative velocity with respect to the atmosphere surrounding the runway, this surrounding atmosphere being at a temperature TA, a means for determining the thickness of frost present on said object, a temperature sensor for measuring the temperature TP of the runway P, a means for regulating the temperature of said object in such a way that the temperature of said object is substantially equal to or below the temperature of the runway, a warning means enabling a warning to be communicated to a monitoring station when the thickness of frost present on said object reaches a value corresponding to a significant thickness of frost on the runway P.

Non-limiting embodiments of the device of the invention could comprise the additional members and/or features described below on their own or in combination in an advantageous manner, wherein the device for anticipating the deposition of frost of a thickness EP on a runway comprises:

a computing means for predetermining at time t0 a thickness of frost EP at time t1 on the runway P, as a function of the first derivative as a function of time (dEO/dt), from the thickness EO of the development curve of the thickness of frost present on the object at time t0.

It is also advantageous:

for the temperature TO of said object, regulated by the regulation means MR, to be slightly lower than the temperature TP of the runway P, and/or for the difference between the temperature of the runway and the regulated temperature of the object to be equal to a predetermined value, for the device further to comprise a means for checking that it is operating correctly before it is brought into operation and/or while it is in operation or as soon as the temperature of the runway or the surrounding atmosphere is lower than a predetermined value, for the object to move in the surrounding atmosphere in order to obtain said non-zero velocity with respect to the atmosphere surrounding the runway, and/or for said object to move in rotation about a fixed axis XX', said object comprising a longitudinal axis YY', situated in a plane perpendicular to the axis of rotation, said moving object being mounted on a rotary arm B having a longitudinal axis ZZ', such that the axes YY' and ZZ' form an angle ALPHA so that the frost formed on the object is not ejected by the centrifugal force, and/or for the device to be placed in a device for the forced convection of the atmosphere surrounding the runway in order to obtain a non-zero relative velocity with respect to the atmosphere surrounding the runway, and/or for the object to start to move only if the temperature of the runway is lower than a predetermined threshold value, and/or for the movement of forced convection of the surrounding atmosphere to be activated only if the temperature of the runway is lower than a predetermined threshold value, and/or for the device to comprise a plurality of arms rotating at different speeds, and/or for a means to make it possible to pilot the speed of rotation of the object as a function of environmental conditions, and/or for a "reset" control to make it possible for the frost to be removed from the object on request (for instance following de-icing (or defrosting) of the runways) so as to take account of the state of the runway surface.

Non-limiting embodiments of the invention also relate to a method for using the device described above, comprising at least:

an object having a non-zero relative velocity with respect to the atmosphere surrounding the runway, said surrounding atmosphere being at the temperature TA, a means for determining the thickness of frost EO present on said moving object, a temperature sensor CT for measuring the temperature TP of the runway P, a means MR for regulating the temperature TO of said moving object in such a way that the temperature TO of said moving object is substantially equal to the temperature TP of the runway, a warning means for communicating the presence of a significant thickness of frost EO on said moving object to a monitoring station PC, and comprising the stages of:

measuring the temperature TP of the runway P, regulating the temperature of the object to a temperature substantially equal to the temperature of said runway P, measuring the thickness of frost present on the object, sending a warning message to a monitoring station as soon as the thickness of frost on the object exceeds a predetermined value.

Non-limiting embodiments of the method of the invention could comprise the additional stages described below on their own or in combination in an advantageous manner:

measuring the temperature TP of the runway P, regulating the temperature of the object to a temperature slightly below the temperature of said runway P, measuring the thickness of frost present on the object, sending a warning message to a monitoring station as soon as the thickness of frost on the object exceeds a predetermined value.

In a further non-limiting embodiment, the method of the invention could comprise the additional stages described below on their own or in combination in an advantageous manner:

measuring the temperature TP of the runway P, regulating the temperature of the object to a temperature equal to or slightly below the temperature of said runway P, measuring the thickness of frost present on the object at time t1, measuring the thickness of frost present on the object at time t1+dt, calculating, from the information on the thickness of frost present on the object at time t1, and the information on the thickness of frost present on the object at time t1+dt, the time DELTAt that the thickness of frost on the runway will take to reach a critical thickness EC, sending a warning message to a monitoring station indicating the time that the thickness of frost on the runway will take to exceed a critical value EC.

An embodiment of the invention will be described below, by way of non-limiting example, with reference to the accompanying drawings, in which:

FIG. 1 is a diagram of an embodiment of the device of the invention in which the object moves in rotation with respect to the surrounding atmosphere;

FIG. 2a is a diagrammatic top view of the device of the invention,

FIG. 2b is a diagrammatic top view of a variant of the device of the invention,

Figure 3:
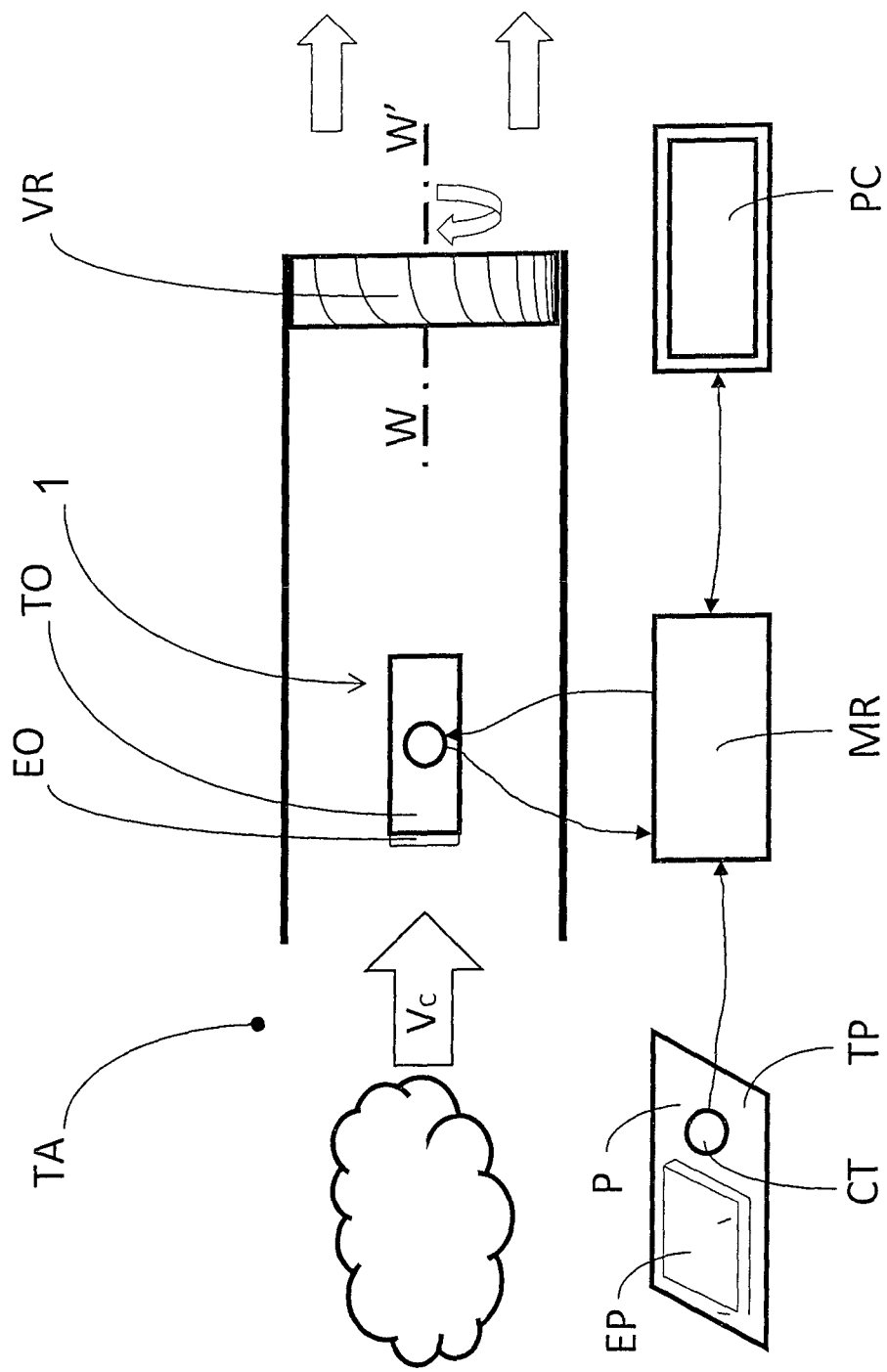
FIG. 3 is a diagram of a further embodiment of the device of the invention in which the object is placed in a device for the forced convection of the surrounding atmosphere.

FIG. 1 is a diagram of a section of runway P comprising a temperature probe CT and being at a temperature TP. A rotary arm B is driven in rotation, by a motor M, about the axis XX'. An object 1 is driven in rotation by the arm B and is kept at a temperature TO by the temperature regulator MR. The object 1 comprises a means for measuring the thickness of frost on the object 1. If the thickness of frost detected on the object 1 is greater than a predetermined value, a warning message is then sent to the monitoring station PC.

FIG. 2a is a diagrammatic top view of the rotary arm B. In this case, the axis ZZ' of the rotary arm and the axis YY' of the object 1 form an angle ALPHA.

FIG. 2b is a diagrammatic top view of the rotary arm B. In this case, a structure 2 substantially perpendicular to the object 1, placed at the end of said object, prevents the frost from being propelled externally under the action of the centrifugal force.

FIG. 3 is a diagram of a further embodiment of the invention. The object 1 is placed in a duct which is in this case of cylindrical shape. A fan VR disposed downstream of the object suctions the surrounding atmosphere thereby creating a non-zero velocity of the surrounding air with respect to the object. The object comprises a means for measuring the thickness of frost present on its frost portion. The temperature of the object is regulated by the regulation means MR to a temperature TO substantially equal to the temperature of the runway and in this case to a temperature 0.5° C. below the temperature TP of the runway P. The information corresponding to the thickness of frost on the object as a function of time is processed by a computing means, taking account of the thickness of the layer of frost on the object and the variation of that thickness as a function of time, in order to determine therefrom in an anticipated manner the presence of significant frost on the runway. That information is then sent to the monitoring station PC.

A method of the invention consists in carrying out the following sequence of stages:
regularly measuring the temperature TP of the runway,
rotating the rotary arm B if the temperature TP is lower than a predetermined value, for instance +5° C.,
regulating the temperature of the moving object to a temperature slightly below the temperature TP (for instance TP −0.4° C.),
measuring the thickness of frost present on the object at time t0,
measuring the variation of the thickness of frost on the object at a time close to t0,
determining, by means of computing means, the thickness of frost which will be present in the near future on the runway (for instance in 30 minutes) by analyzing the measurement of the thickness of frost present on the object 1 at time t0 and the measurement of the variation of the thickness of frost on the object at a time close to t0,
sending the result obtained by the computing means to a monitoring station.

A further method of the invention consists in carrying out the following sequence of stages:
regularly measuring the temperature TP of the runway,
moving the surrounding atmosphere about the object if the temperature TP is below a predetermined value, for instance +5° C.,
regulating the temperature of the moving object to a temperature slightly below the runway temperature TP (for instance TP −0.4° C.),
measuring the thickness of frost present on the object at time t0,
the variation of the thickness of frost on the object at a time close to t0,
determining, by means of computing means, the thickness of frost which will be present in the near future on the runway (for instance in 30 minutes) by analysing the measurement of the thickness of frost present on the object 1 at time t0 and the measurement of the variation of the thickness of frost on the object at a time close to t0,
sending the result obtained by the computing means to a monitoring station.

It will be appreciated that the device is susceptible of industrial application and that a method for anticipating the thickness of frost which will be present on a runway may be envisaged.

A person skilled in the art could apply this concept to many other similar systems without departing from the scope of the invention defined in the accompanying claims. The device or the method defined in the accompanying claims could, for instance, be used to anticipate the level of frost on a blade of a wind turbine or on a mechanism whose operation may be adversely affected by the presence of frost.

The invention claimed is:

1. A device for anticipating the deposition of frost of a thickness on a runway, comprising
an object having a non-zero relative velocity with respect to the atmosphere surrounding the runway, this surrounding atmosphere being at a temperature,
a frost-thickness measuring device for measuring the thickness of frost present on said object,
a temperature sensor for measuring a temperature of the runway,
a temperature regulator for regulating a temperature of said object in such a way that the temperature of said object is substantially equal to or below the temperature of the runway,
a warning system enabling a warning to be communicated to a monitoring station (PC) when the thickness of frost on said object reaches a value corresponding to a significant thickness of frost on the runway.

2. A device according to claim 1, further comprising a computer for predetermining at time t0 a thickness of frost at time t1 on the runway from the first derivative with respect to time of a development curve of the thickness of frost present on the object at time t0.

3. A device according to claim 1, wherein the temperature of the object regulated by the temperature regulator is below the temperature of the runway.

4. A device according to claim 3, wherein the difference between the temperature of the runway and the regulated temperature of the object is equal to a predetermined value.

5. A device according to claim 1, comprising a device for checking that the system is operating correctly as soon as the temperature of the runway is below a predetermined threshold value.

6. A device according to claim 1, wherein the object may move in the surrounding atmosphere in order to achieve the non-zero velocity with respect to the atmosphere surrounding the runway.

7. A device according to claim 6, wherein said moving object moves in rotation about a fixed axis XX', said moving object comprising a longitudinal axis YY', situated in a plane perpendicular to the axis of rotation, said moving object being mounted on a rotary arm having a longitudinal axis ZZ', such that the axes YY' and ZZ' form an angle ALPHA so that the frost formed on the object is not ejected by the centrifugal force.

8. A device according to claim 1, comprising a device for the forced convection of the atmosphere surrounding the runway in which the object is placed in order to obtain said non-zero velocity with respect to the atmosphere surrounding the runway.

9. A method for the anticipated detection of the deposition of a thickness of frost on a runway, comprising:
an object having a non-zero velocity with respect to an atmosphere surrounding the runway, said surrounding atmosphere being at a temperature, a frost measuring device for measuring the thickness of frost present on said object, a temperature sensor for measuring a temperature of the runway, a temperature regulator for regulating a temperature of said object in such a way that the temperature of said object is substantially equal to the temperature of the runway, a warning system for sending a warning to a monitoring station when the thickness of frost on said object reaches a value corresponding to a significant thickness of frost on the runway, the method comprising the stages of:

measuring the temperature of the runway, regulating the temperature of said object to a temperature equal to or slightly below the temperature of said runway, measuring the thickness of frost present on said object, sending a warning message to a monitoring station as soon as the thickness of frost on the object exceeds a predetermined value.

10. A method for the anticipated detection of the deposition of frost of a thickness on a runway according to claim 9, wherein the stage of measuring the thickness of frost on said object consists in:

measuring the thickness of frost present on the object at time $t0$, measuring the thickness of frost on the object at time $t1=t0+dt$, in order to calculate, from the information on the thickness of frost present on the object at the times $t0$ and $t1$, the time DELTAt that the thickness of frost on the runway will take to reach a critical thickness and in that during the stage consisting in sending a warning message to a monitoring station, the warning message indicates the time that the thickness of frost on the runway will take to exceed said critical value.

* * * * *